United States Patent [19]

Whittaker

[11] Patent Number: 4,661,758

[45] Date of Patent: Apr. 28, 1987

[54] SOLAR POWER SUPPLY AND BATTERY CHARGING CIRCUIT

[75] Inventor: Jerry R. Whittaker, Phoenix, Ariz.

[73] Assignee: Lane S. Garrett, Scottsdale, Ariz.

[21] Appl. No.: 123,561

[22] Filed: Feb. 22, 1980

[51] Int. Cl.[4] ............................ H02J 7/10; G05F 1/60
[52] U.S. Cl. ...................................... 320/21; 136/293; 323/906
[58] Field of Search .......................................... 320/2–4, 320/21, 35, 53; 307/66, 87, 69; 136/206, 291, 293; 250/211 R, 215; 323/15, 906

[56] References Cited

U.S. PATENT DOCUMENTS

| | | | |
|---|---|---|---|
| 3,384,806 | 5/1968 | Hartman | 320/35 UX |
| 3,531,706 | 9/1970 | Mullersman | 320/35 X |
| 3,600,599 | 8/1971 | Wright et al. | 307/69 X |
| 3,731,474 | 5/1973 | Tsuruishi | 250/215 X |
| 3,740,636 | 6/1973 | Hogrefe et al. | 320/35 X |
| 3,956,687 | 5/1976 | Lindenman | 323/15 X |
| 4,143,282 | 3/1979 | Berard, Jr. et al. | 323/15 X |
| 4,186,336 | 1/1980 | Weinberg et al. | 323/906 X |

FOREIGN PATENT DOCUMENTS 2529906  1/1977  Fed. Rep. of Germany ........ 323/15

OTHER PUBLICATIONS

RCA Technical Notes No. 783, 9/25/1968, "Shunt Type Voltage Regulator", Nekrasov.

*Primary Examiner*—R. J. Hickey
*Attorney, Agent, or Firm*—LaValle D. Ptak

[57] ABSTRACT

A photovoltaic power supply and battery charging system comprises a photovoltaic solar energy power supply panel connected through a blocking diode to a secondary storage battery which, in turn, is connected to a suitable load. A temperature sensitive reference voltage is supplied to one input of a voltage comparator, the other input to which is connected to the battery and thereby varies in accordance with the variations of charge on the battery. A short circuit shunt switch is connected directly across the photovoltaic panel; and this shunt switch is opened for varying periods of time by the output of a variable pulse width generator. The pulse width generator, in turn, is connected to and is controlled by the output of the voltage comparator to produce pulses of different widths. The charging current supplied to the battery then occurs in the form of high current pulses of varying widths depending upon the charge state of the battery.

7 Claims, 2 Drawing Figures

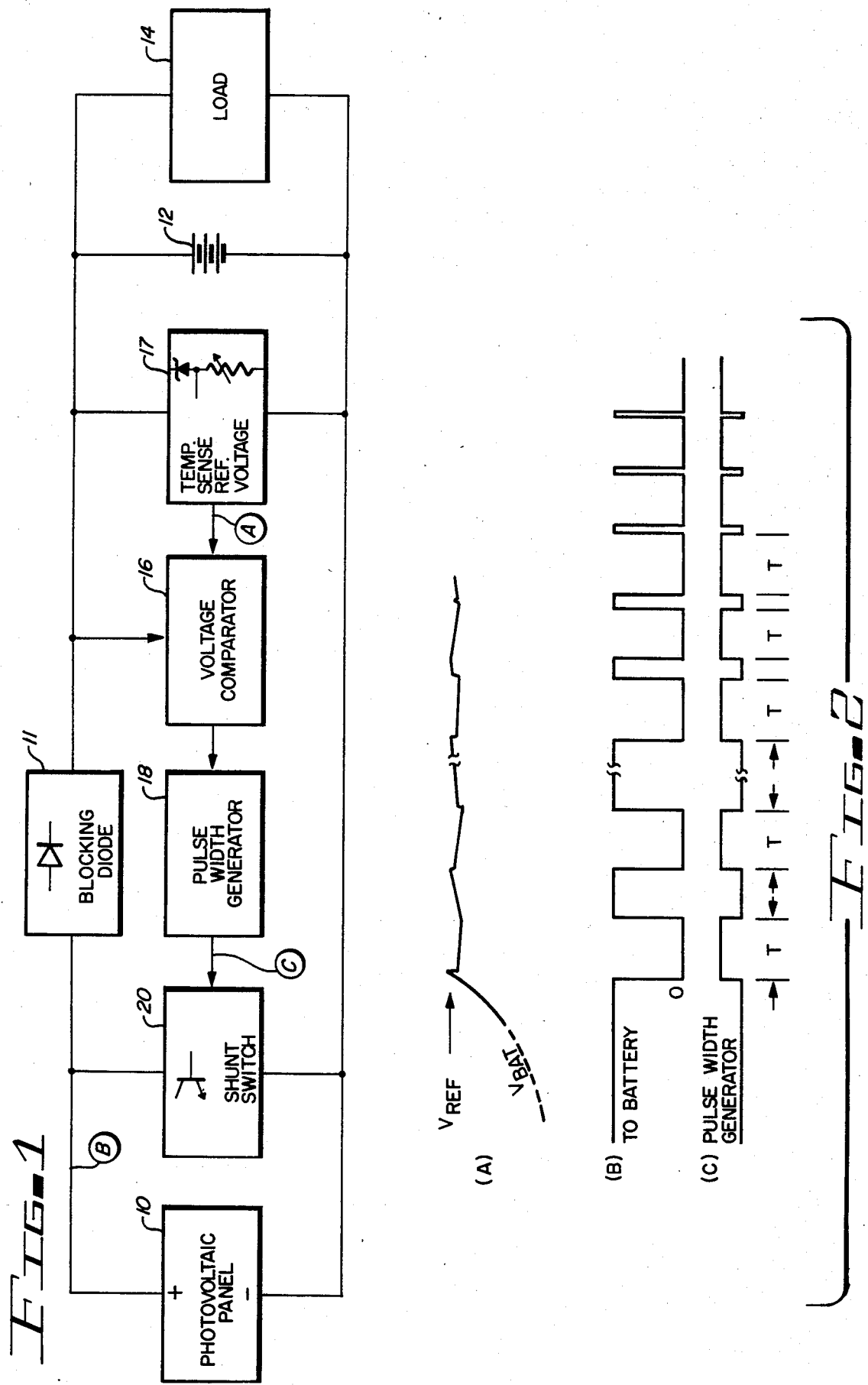

In accordance with a preferred embodiment of this invention, a solar power supply and battery charging circuit includes a solar energy source which supplies utilization current to a load and charging current to a secondary battery when the solar source is subjected to sunlight. A secondary battery is coupled in series circuit with the solar energy source and is charged by the current supplied from the solar energy source. A control circuit is connected to the battery to sense the state of charge of the battery and, in turn, controls the operation of a variable pulse width generator. The output pulses of the pulse width generator are applied to a short circuit shunt switch connected across the solar energy source terminals to open the shunt switch periodically for varying intervals of time as determined by the charge condition of the secondary battery.

BRIEF DESCRIPTION OF THE DRAWINGS

FIG. 1 is a block diagram of a preferred embodiment of the invention; and

FIG. 2 illustrates waveforms useful in understanding the operation of the circuit shown in FIG. 1.

DETAILED DESCRIPTION

Reference now should be made to FIG. 1 of the drawings which shows a photovoltaic power supply/battery charging system in accordance with a preferred embodiment of the invention. A photovoltaic cell or solar power cell 10 is used as the primary source of power for the system shown in FIG. 1. Such cells are well known; and, as shown in FIG. 1, the cell 10 is connected through a blocking diode 11 to the positive terminal of a secondary battery 12 in a charging circuit relationship. The cell 10 and the battery 12, in turn, are connected in parallel with a suitable load 14 which may be of any type commonly used with photovoltaic power supplies. As is well known, the power supplied to the load 14 primarily is obtained from the photovoltaic cell 10 when the cell is irradiated by the sun. This power is supplemented by the battery 12 when the output of the photovoltaic cell 10 drops to a lower potential than the potential supplied by the battery 12. The blocking diode 11 isolates the photovoltaic cell from the battery 12 in this latter condition of operation. This is a common circuit arrangement employed in a wide variety of different applications.

The battery 12 is considered a secondary battery or secondary power source in the system. Various types of rechargable dry cell batteries may be used for the battery 12; but in all cases, it is necessary to avoid overcharging of the battery 12 to prevent its destruction and to reduce the risk of explosion. Consequently, the battery charging system of FIG. 1 includes circuitry for regulating the charge and yet permit the battery 12 to be charged as rapidly as possible when it is in a low or discharged condition.

To accomplish this control, a voltage comparator 16 senses the voltage on the battery at one input and compares this voltage with a reference voltage applied to its other input. The reference voltage, in turn, is provided by a temperature responsive reference voltage circuit 17. A fixed reference voltage could be employed; but for maximum efficiency in the system, the reference voltage provided by the reference voltage circuit 17 is obtained, as diagramatically illustrated within the block 17, by a voltage divider circuit consisting of a Zener diode, or other stable voltage dropping circuit element, connected in series with a temperature variable resistence across the terminals of the battery 12. The particular circuitry used within the temperature variable reference voltage source 17 is not important and, if necessary, could also include active circuit components.

The temperature variable characteristic of the circuit 17 is chosen to have a characteristic value which varies in accordance with the ambient temperature at the battery; so that the circuit 17 is located in close physical proximity to the battery 12. The circuit 17 operates to provide a higher reference voltage at the output of the circuit 17 when the battery 12 is cold than when the battery is hot. This, in turn, permits the battery 12 to be charged to a higher voltage when it is cold than when it is hot since this is necessary for a cold battery, as is well known. By utilizing this type of a reference circuit for the reference voltage circuit 17, maximum efficiency may be realized in the system. The circuit elements of the temperature responsive reference circuit are selected to be such that a stable reference characteristic is provided, except for the variation which is provided in accordance with temperature changes of the ambient temperature. Consequently, the particular charge state of the battery 12, so long as it is in excess of some minimum amount, has no affect on the reference voltage supplied from the circuit 17 to the voltage comparator 16.

The output of the voltage comparator 16 then is coupled to the input of a variable pulse width generator 18; and when the desired battery voltage is reached, an output signal is supplied to trigger the pulse width generator circuit 18 into operation. The widths of the pulses supplied at the output of the pulse width generator 18 are indicated in waveform C of FIG. 2. This output is in the form of positive pulses of constant width separated by negative intervals of variable width depending upon the condition of the output of the voltage comparator circuit 16, and is used to operate a short circuit shunt switch 20. The negative intervals at the output of the pulse generator 18 may be considered the variable width pulses for the purpose of this description.

The shunt switch 20, illustrated in FIG. 1, typically is any suitable type of electronically operated switch which is capable of providing substantially a dead short across the photovoltaic cell 10 when the switch is closed. The switch is illustrated as an NPN transistor in FIG. 1, but it may include additional components and essentially operates as a single-pole/single-throw switch. The switch 20 must be capable of handling relatively high current output from the photovoltaic panel in view of the fact that it is necessary to divert a short circuit current through it for the duration of each of the output pulses from the pulse width generator 18. When a transistor is used, of course, the closing of the switch is accomplished by rendering the transistor fully conductive in its saturated condition in response to the application of the pulses from the generator 18 to the base or control electrode of the transistor. Upon termination of each positive output pulse from the pulse width generator 18, the switch 20 is rendered non-conductive and operates as an open circuit to the photovoltaic cell 10. Consequently, the length of time charging current is applied to the battery 12, as shown in waveform B, varies directly with the time intervals between the pulses from the pulse width generator 18, as illustrated in FIG. 2. Whenever the switch 20 is open, the full voltage available from the photovoltaic panel 10 is applied to the battery 12 to charge the battery.

SOLAR POWER SUPPLY AND BATTERY CHARGING CIRCUIT

BACKGROUND OF THE INVENTION

Solar batteries, such as photovoltaic cells and the like, are enjoying increasing popularity in a variety of applications. Such batteries are highly reliable, have a long life, and now are economically produced. Initially, the applications for such batteries were for remote electronic control systems located at substantial distances from conventional power supplies, such as weather telemetering equipment, sea lighting buoys, and the like. In the consumer field, small photovoltaic batteries are used as the power source for electronic wristwatches and portable radios.

Since photovoltaic cells generate electric power in response to illumination or irradiation by the sun's rays, it is necessary to provide a supplemental or secondary battery supply for use in conjunction with photovoltaic solar batteries when sunlight is not available for energizing the photovoltaic cell. Ideally, the photovoltaic solar battery is used to charge a rechargable secondary battery during the times that the photovoltaic battery is capable of supplying power; so that the secondary battery then can take over during the times when the photovoltaic battery is not subjected to sunlight and, therefore, is essentially inoperative. In this way, electric power may be continuously supplied to a load, irrespective of the availability of sunlight.

It is necessary to limit the charging current to the battery once the battery has been fully charged. In the past, such limitation has been effected primarily by systems which utilize a resistive shunt across the voltaic cell or power supply terminals to dissipate energy once the battery has been charged up to its fully charged level. Systems of this type require relatively large heat sinks, and rather substantial heat dissipating shunt components are necessary to dissipate all of the energy and heat which is produced by the shunt circuit. A system of this type is disclosed in the patent to Takeda et al, U.S. Pat. No. 3,979,656, issued Sept. 7, 1976. In the Takeda patent, a power transistor is used in the bypass circuit as a variable resistance shunt. As the battery charge level of the secondary battery reaches its fully charged state, increasingly large amounts of energy must be dissipated by the variable resistance shunt transistor.

Another approach to regulating the charging current supplied to a secondary battery in a solar cell/battery system is disclosed in the patent to Hartman, U.S. Pat. No. 3,384,806, issued May 21, 1968. This patent is directed to a pulse width modulated charging system using a series transistor switch between the solar cell array and the battery being charged. The ratio of the conductive time and the non-conductive time of this series switch is controlled as a function of the derivative of the output power with reference to the output current transferred to the load. The system continuously matches the output impedance of the electric power generator comprising the system with the loads this generator is supplying. The relationship of the system operation, however, to the secondary or stand-by battery, is not related to the charge condition of the battery for the embodiment shown in the circuits of this patent utilizing a solar cell array for the primary power source. In an alternative system disclosed in the Hartman patent, a thermionic generator senses the charge state of the secondary battery to vary the amount of fuel supplied to a burner which, in turn, controls the operation of a heat-to-voltage converter used to supply charging current to the battery and operating current for the system loads used.

Three other typical prior art patents utilizing solar cell/battery combinations are the patents to Ule, U.S. Pat. No. 3,696,286, issued Oct. 3, 1972; Hogrefe, U.S. Pat. No. 3,740,636, issued June 19, 1973; and, Cardwell, Jr., U.S. Pat. No. 3,816,804, issued June 11, 1974. The Ule patent discloses a battery charging circuit which has a transistor in it for periodically drawing a large current from the solar cell through an inductor under the control of a difference amplifier in order to boost the array voltage of the battery. This patent, however, does not include any system for sensing the storage battery charge condition. The Hogrefe patent is directed to a system in which a shunt amplifier loads the solar cell array through resistors in response to a preestablished charge condition of the battery. Thus, heat dissipating resistors are required, subject to the disadvantages of such systems as described above. The Cardwell patent is directed to a complex system using pulse width modulation charging of a battery and which alternately and cyclically controls the charging and discharging of the battery.

The systems of the prior art all are subject to considerable disadvantages in the manner of handling the charging of the stand-by or secondary battery when a fully charged condition is reached. During the normal operation of such systems when sunlight is available, the fully charged condition of the stand-by battery generally is attained fairly quickly, so that several hours of operation while the secondary battery is fully charged take place. It is desirable to provide a simple and effective way of controlling the charging of a secondary battery in a solar cell/battery system which does not require large heat dissipating components and which is relatively simple to implement and operate. In addition, it is desirable to provide a charging circuit where a solar power supply is utilized to effect rapid charging of a secondary battery.

SUMMARY OF THE INVENTION

Accordingly, it is an object of this invention to provide an improved charging circuit for the secondary battery in a solar battery/secondary battery power supply system.

It is another object of this invention to provide a simple secondary battery charging circuit utilizing a solar energy source.

It is an additional object of this invention to provide a secondary battery charging circuit using a solar energy source and which does not require heat dissipating resistive shunts.

It is a further object of this invention to utilize a solar energy source to supply pulses of high charging current to a secondary battery in which the current pulses are of an inverse time duration to the charge condition of the secondary battery.

It is yet another object of this invention to provide a battery charging system using a solar energy cell as a energy source in which the terminals of the solar energy source are periodically short circuited by a shunt switch for varying time intervals determined by the charge condition of the battery.

In the past, as discussed above in the "Background" section, it has been considered necessary to use a resistive shunt of some type in the circuit position occupied by the shunt switch 20 in FIG. 1. Typical power supplies cannot operate without damage if a short circuit occurs across the terminals of such power supplies. Contrary to this general understanding of prior systems, it has been found that the photovoltaic cell 10 is not harmed in any way when a dead short is applied across its output terminals. Consequently, no heat sinks or power dissipating resistors are employed in the shunt switch 20, but a simple switch capable of handling the current involved is used to either present a fully open circuit condition across the photovoltaic cell or a full dead short when the switch 20 is closed.

As the battery 12 becomes fully charged, the shunt switch 20 is opened for a significantly smaller time interval between each of the periiodic pulses from the output of the pulse width generator 18 than when the battery 12 is in a low or discharge condition. This is illustrated in the waveforms B and C of FIG. 2, progressively from left to right. At the left-hand portion of these waveforms, a discharge condition of the battery 12 is indicated; so that the shunt switch 20 is off or open for a relatively large percentage of the total time of system operation.

As the fully charged condition of the battery 12 is attained, the output of the voltage comparator 16 occurs nearly instantaneously after the termination of the previous pulse from the pulse width generator 18 to initiate the next pulse. Consequently, the pulses for charging the battery 12 are very narrow, as is apparent from an examination of the right-hand portion of waveform B in FIG. 2. This is the trickle charge condition of operation of the system, or the stand-by condition. Since there are no energy dissipating resistances in the circuit between the output of the photovoltaic cell 10 and the positive terminal of the battery 12, the trickle charge is in the form of short pulses of high current. This is a desirable condition for trickle charging of a battery and is much to be preferred over lower current level charge as is obtained with many conventional devices not using a short circuit shunt such as the switch 20 employed in the circuit of FIG. 1.

Waveform A of FIG. 1 illustrates the charge condition of the battery 12 (V bat) relative to the voltage reference supplied by the reference voltage circuit 17. It can be seen that the battery voltage drops during the periods of time that the pulse width generator output is high causing the shunt switch 20 to be closed, creating a short circuit across the photovoltaic cell 10, and that the battery voltage rises during the time periods when the shunt switch 20 is open.

As will be apparent to those skilled in the art, it may be desirable to add hysteresis to the operation of the voltage comparator 16 to permit adjustment of the reference voltage when "charging" and "not charging" to take into account the resistance of the battery 12.

The foregoing description and the circuit illustrated in FIG. 1 are to be considered illustrative of the invention and not limiting. The circuit is a simple and effective system for obtaining maximum operating efficiencies of a photovoltaic power supply/battery charging system, which may be used in any of the applications normally utilizing such a combination for a power supply. The short circuit shunt switch may be in any configuration capable of operating in the manner described above and having the ability to handle the short circuit currents produced by the photovoltaic cell 10. Various changes and modifications will occur to those skilled in the art without departing from the true scope of the invention.

I claim:

1. A solar power supply and battery charging circuit including in combination:
    a photovoltaic solar energy source of direct current;
    a secondary battery coupled with said photovoltaic solar energy source for being charged thereby;
    control circuit means coupled with said battery to sense the state of charge thereof, said control circuit means comprising a voltage comparator and a voltage reference circuit means, said voltage comparator coupled to said voltage reference circuit means and said secondary battery for producing signals on an output indicative of a predetermined relationship between the voltages supplied thereto;
    a short-circuit shunt open/closed switch means coupled across said entire photovoltaic solar energy source to place a full dead short circuit across said photovoltaic energy source when said switch means is closed and a fully open circuit across said photovoltaic energy source when said switch means is open;
    pulse width generator means coupled to the output of said voltage comparator and operated in response to the signals on the output of said comparator to produce output pulses of varying width proportional to the state of charge sensed by said control circuit means, said pulse width generator means further coupled with said shunt switch means for continuously periodically fully closing and fully opening said shunt switch means in response to the variable width output pulses produced by said pulse width generator means, causing the proportion of total time said switch means is open to decrease to a minimum amount as said battery becomes fully charged; and
    means for preventing said secondary battery from discharging through said shunt switch means.

2. The combination according to claim 1 wherein said shunt switch means provides substantially a short circuit shunt across said solar energy source when said shunt switch means is closed in respnse to pulses from said pulse width generator means.

3. The combination according to claim 2 wherein said shunt switch means comprises a transistor switch means.

4. The combination according to claim 1 further including a blocking diode coupled in series between said solar energy source and said secondary battery, with said shunt switch means coupled at one end to a junction between said solar energy source and said blocking diode.

5. The combination according to claim 1 wherein said shunt switch means comprises a normally non-conductive transistor switch means having first and second electrodes connected in series circuit across said photovoltaic solar energy source and having a control electrode connected to said variable pulse width generator means and rendered alternately fully conductive and fully non-conductive in varying relative amounts in response to each cycle of the pulses supplied to said control electrode by said pulse width generator means.

6. The combination according to claim 1 wherein said voltage reference circuit means produces a temperature responsive reference voltage which varies in proportion to variations in ambient temperature.

7. The combination according to claim 6 wherein said temperature responsive voltage reference circuit means is located in close proximity to said battery to sense the ambient temperature to which said battery is subjected.

* * * * *